United States Patent [19]

Smith et al.

[11] Patent Number: 5,532,660
[45] Date of Patent: Jul. 2, 1996

[54] MANUAL OVERRIDE MECHANISM FOR A REMOTE CONTROLLED CIRCUIT BREAKER

[75] Inventors: Lowell D. Smith, Cedar Rapids, Iowa; Robert G. Cook, West Chester, Ohio

[73] Assignee: Square D Company, Palatine, Ill.

[21] Appl. No.: 397,025

[22] Filed: Feb. 28, 1995

Related U.S. Application Data

[63] Continuation of Ser. No. 901,365, Jun. 19, 1992, abandoned, which is a continuation-in-part of Ser. No. 722,050, Jun. 28, 1991, Pat. No. 5,180,051.

[51] Int. Cl.⁶ .................................................. H01H 75/00
[52] U.S. Cl. ................................................. 335/14; 335/20
[58] Field of Search .................... 335/14, 20; 361/42–50

[56] References Cited

U.S. PATENT DOCUMENTS

| | | | |
|---|---|---|---|
| 4,164,719 | 8/1979 | Young et al. | 335/14 |
| 4,623,859 | 11/1986 | Erickson et al. | 335/14 |
| 5,083,103 | 1/1992 | Winter et al. | 335/14 |
| 5,301,083 | 4/1994 | Grass et al. | 361/64 |
| 5,331,301 | 7/1994 | Glennon et al. | 335/20 |

Primary Examiner—Lincoln Donovan
Attorney, Agent, or Firm—Larry I. Golden; Kareem M. Irfan; Wayne H. Stoppelmoor

[57] ABSTRACT

A remotely controllable circuit breaker device for interrupting power in a circuit path between a source and a load includes local and remote monitoring capabilities and a worm-gear mechanism for reliable control of the interruption mechanism. The device includes a first contact and a second contact cooperatively arranged in the circuit path so as to provide current from the source to the load. At least one of the contacts are movable for interrupting the power provided to the load. The worm gear mechanism includes a motor with a rotatable shaft which responds to open and closed control signals generated from a remote location, and a gear, rotatably responsive to the rotatable shaft, for controlling the movable contact so that the circuit path is interrupted and established, respectively. The worm gear mechanism controls the movable contact using a coupling arrangement, which has a first part coupled to the movable contact and a second part coupled to the gear. A manually operated member is used to render the coupling arrangement nonresponsive to the worm gear.

21 Claims, 8 Drawing Sheets

MANUAL OVERRIDE MECHANISM FOR A REMOTE CONTROLLED CIRCUIT BREAKER

CROSS-REFERENCE TO RELATED APPLICATIONS

This application is continuation of application Ser. No. 07/901,365, filed Jun. 19, 1992, entitled "Manual Override for a Remote Controlled Circuit Breaker", now abandoned, which was a continuation in part of U.S. patent application Ser. No. 07/722,050, filed Jun. 28, 1991, entitled "Remote Control Circuit Breaker" now U.S. Pat. No. 5,180,051.

BACKGROUND OF THE INVENTION

The present invention relates generally to remote control circuit breakers and, more particularly, to improvements in the control of remotely controlled circuit breakers.

BACKGROUND OF THE INVENTION

Remote control circuit breakers are commonly used for temporary interruption of electrical service during peak use hours and for programmable lighting control of industrial locations. By opening and closing on demand from a remote location, these circuit breakers provide a significant improvement over manually operated circuit breakers in terms of convenience.

A variety of operating mechanisms have been employed to realize remote control of circuit breakers. One of the more common types of remote control mechanisms energizes a solenoid to hold the circuit breaker in the open position. Such energization must be continuous to prevent the circuit breaker from moving to the closed position.

Improved remote control mechanisms have included the use of a motor to operate the opening or closing of the contacts. The motor is coupled to one of the contacts through a gear, which rotates simultaneously with the shaft of the motor to cause the circuit breaker contacts to open and close.

A further improved remotely controlled circuit breaker mechanism is disclosed in the above-referenced co-pending U.S. patent application Ser. No. 07/722,050, which includes gear driving means responsive to "open" and "closed" control signals generated from a remote location for moving a moveable one of a pair of electrical contacts through associated gear means in order to correspondingly interrupt or establish a circuit path.

In all such remote controlled circuit breaker mechanisms, it is desirable to provide override means for manually controlling the circuit breaker when necessary by disabling or overriding the remote control mechanism for the circuit breaker. There exists a distinct need for a simple and conveniently operable manual override mechanism which is particularly adapted for use with remote control circuit breaker mechanisms.

SUMMARY OF THE INVENTION

It is a general object of the present invention to provide an improved remote control circuit breaker arrangement which is convenient to monitor and operate both locally and remotely.

It is a more specific object of the present invention to provide a remote control circuit breaker having an improved manual override mechanism for disabling the remote control mechanism when necessary.

It is a related object of this invention to provide an improved circuit breaker arrangement which includes a manual override mechanism of the above type which is simple in design, conveniently manufactured, and capable of being easily assembled into the circuit breaker.

In accordance with the present invention, the foregoing objectives are realized by providing a manual override mechanism particularly adapted for use with a remotely controllable circuit breaker device which includes: a first contact and a second contact cooperatively arranged in the circuit path so as to provide current from the source to the load and at least one of the contacts being movable for interrupting the power provided to the load; gear driving means, responsive to "open" and "closed" control signals generated from a remote location, for moving the movable contact so that the circuit path is correspondingly interrupted and established; and a rotatable gear means which responds to the gear driving means and is coupled to the movable contact so that the circuit path is interrupted in response to the control signal.

BRIEF DESCRIPTION OF THE DRAWINGS

Other objects and advantages of the invention will be apparent from the following detailed description and the accompanying drawings in which.

While the invention is susceptible to various modifications and alternative forms, a specific embodiment thereof has been shown by way of example in the drawings and will be described in detail. It should be understood, however, that it is not intended to limit the invention to the particular form described, but, on the contrary, the invention is to cover all modifications, equivalents, and alternatives falling within the spirit and scope of the invention as defined by the appended claims.

DESCRIPTION OF THE PREFERRED EMBODIMENTS

Turning now to the drawings and referring specifically to FIGS. 1–4, there is illustrated a remotely controllable circuit breaker arrangement wherein the manual override mechanism according to the present invention may be used advantageously. The arrangement includes an insulative body or housing 10 closed at one face by a detachable cover 12, a line terminal 14 and a load terminal 16 for completing the circuit between the source and load (not shown). More specifically, the circuit path beginning at line terminal 14 carries current through stationary and movable contacts 18 and 20 and through a flexible copper conductor 22, which is soldered between a carrier 24 and a bimetal 28. The movable contact 20 may be formed as part of the carrier 24. A rigid conductive plate 29, which is welded to the bimetal 28, carries current from the bimetal 28 to the load terminal 16.

The above-described current path is controlled remotely and locally by a number of different components, some of which are similar in structure and operation to the corresponding components used in Square D Companys circuit breaker Model No. QO-PL, and described in U.S. Patent No. 4,623,859, entitled *REMOTE CONTROL CIRCUIT BREAKER*, issued on Nov. 18, 1986, and assigned to Square D Company, which is also the assignee of all rights to the subject application. For example, the components associated with an external operating handle 30 and a trip mechanism assembly, whose descriptions immediately follow, are similar in structure and operation to the corresponding components in the above-referenced product and patent.

Local control of the circuit breaker arrangement is provided using the external operating handle 30 pivotally mounted about an axis 32 in the housing 10 to control the contact carrier 24. The upper end of the contact carrier 24 is rotatably secured to the bottom of the operating handle 30 so that the contact carrier 24 can be rocked clockwise and counterclockwise using a biasing spring 34. The biasing spring 34 is secured to the bottom of the carrier 24 and to an equilibrium position on a trip lever 36 so as to urge the carrier 24 toward the handle 30.

In response to movement of the handle 30 to the right or left, the carrier 24 is moved counterclockwise or clockwise, respectively, by the action of the spring 34. The handle 30 moves the top of the carrier 24 to either side of the equilibrium position, so that the bottom of the carrier 24 biases the movable contact 20 to either the open or closed position.

The trip mechanism assembly includes an armature 27, a bimetal member 28 and a yoke 26. Upon the occurrence of a moderately sustained overload, from the contact-closed position (FIG. 2), the bimetal member 28 heats up and flexes to the right, causing the armature 27 and the yoke 26 to swing counter-clockwise (FIG. 3b) so as to release the stand-off pressure of the end of the trip lever 36, which is pivotable about a pin 38. This causes the trip lever 36 to swing clockwise and the spring 34 to pull the carrier 24 away from the stationary contact 18 so as to interrupt the current path.

Figure 3A:
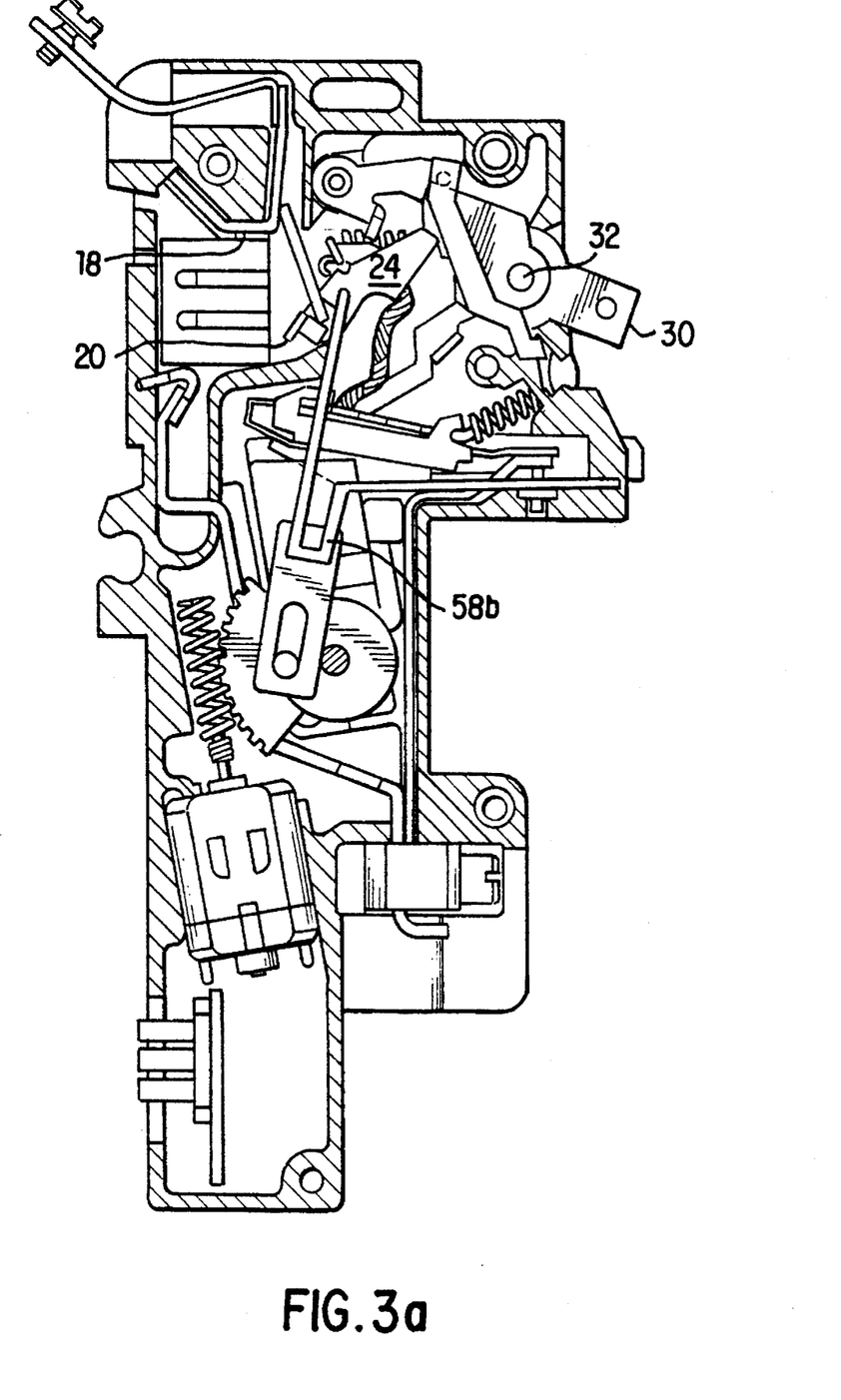
FIG. 3a is a side view of the circuit breaker of FIG. 1 with the cover removed, showing circuit breaker in the open position.
Figure 3B:
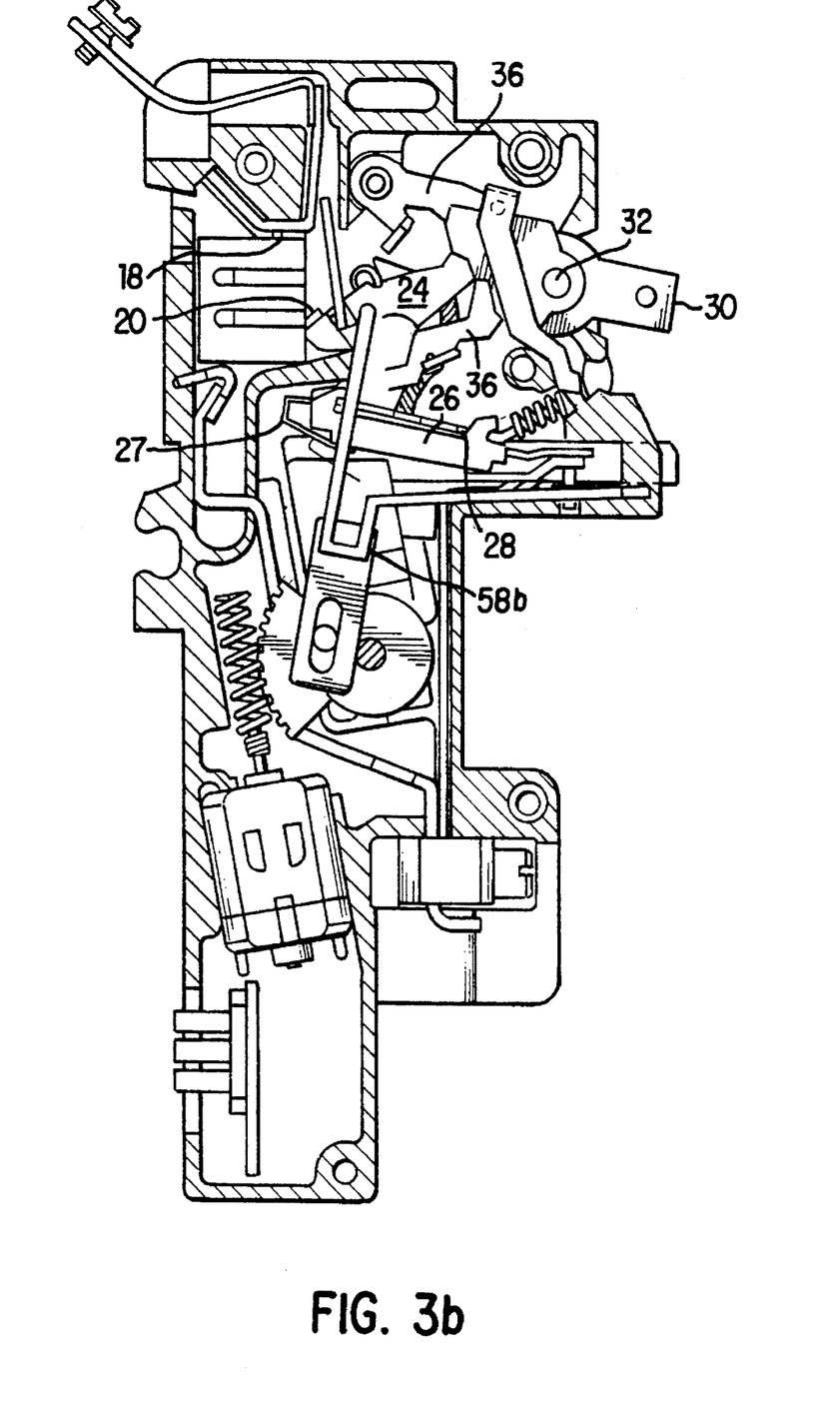
FIG. 3b is a side view of the circuit breaker of FIG. 1 with the cover removed, showing the circuit breaker in the tripped position.

Similarly, upon the occurrence of an extensive current overload, the yoke 26 manifests a magnetic force that attracts the armature 27, causing it to swing counterclockwise. This causes the trip lever 36 to swing clockwise and the spring 34 to pull o the carrier 24 so that the current path is interrupted.

After being tripped, the trip mechanism assembly is reset by cocking the operating handle 30 to the right so that the bottom of the operating handle 30 pushes pin 40. This engagement of the pin 40 rotates the trip lever 36 in a counterclockwise direction to allow the end of the trip lever 36 to engage and set the armature 27.

In the circuit breaker arrangement described above, remote control is provided using a motor 50 having a shaft 52 which rotates in one direction to pull the carrier 24 and break the current path and which rotates in the opposite direction to allow the carrier 24 to be pulled by spring 34 to re-establish the current path. This is accomplished with a shaft spring 54 which is mounted over the shaft 52, and a gear 56 which rotates about a pin 57 to control a drive rod assembly or coupling arrangement 58 which includes (i) a substantially rectangular plate member 58a having an aperture defined therein for accommodating a coupling pin 64 linked to the gear 56, and (ii) a hook-shaped coupling member 58b having a leg portion which extends into a hole 25 in the contact carrier 24 for pulling the carrier 24. The shaft spring 54 is secured at one end 60 to the shaft 52, using a torsional-type pressure fitting, so that the shaft spring 54 rotates with the motor shaft 52. The gear 56 includes teeth 62 which interlock with the windings of the spring 54 to establish a linear relationship between the rotation of the shaft 52 and the rotation of the gear 56 about pin 57. For example, clockwise rotation of the shaft 52 may correspond to a counterclockwise rotation of the gear 56 about pin 57.

The coupling pin 64, which is secured to and protrudes out of the gear 56, responds to the rotation of the gear 56 to control the position of the contact carrier 24 by virtue of being coupled thereto through the drive rod assembly 58. As the gear teeth 62 move with the shaft spring 54, the side of the gear 56 opposite the teeth 62 rotates to the same degree, thereby forcing the coupling pin 64 to rotate about pin 57. The movement of the coupling pin 64 in the counterclockwise direction pulls the drive rod assembly 58 to the right in order to pull the contact carrier 24 away from the stationary contact 18. The drive rod assembly 58 and particularly the dimensions of the plate member 58a and the leg portion of the hook-shaped member 58b are such as to provide a gap on the right side of the coupling pin 64 when the gear 56 is fully rotated clockwise so that the contact carrier 24 does not prevent the contacts 18 and 20 from closing.

In response to the motor operating in the opposite direction, the coupling pin 64 rotates in the clockwise direction and through the coupling arrangement provided by the drive rod assembly 58 allows the biasing spring 34 to return the contact carrier 24 to the contacts-closed position.

Figure 1:
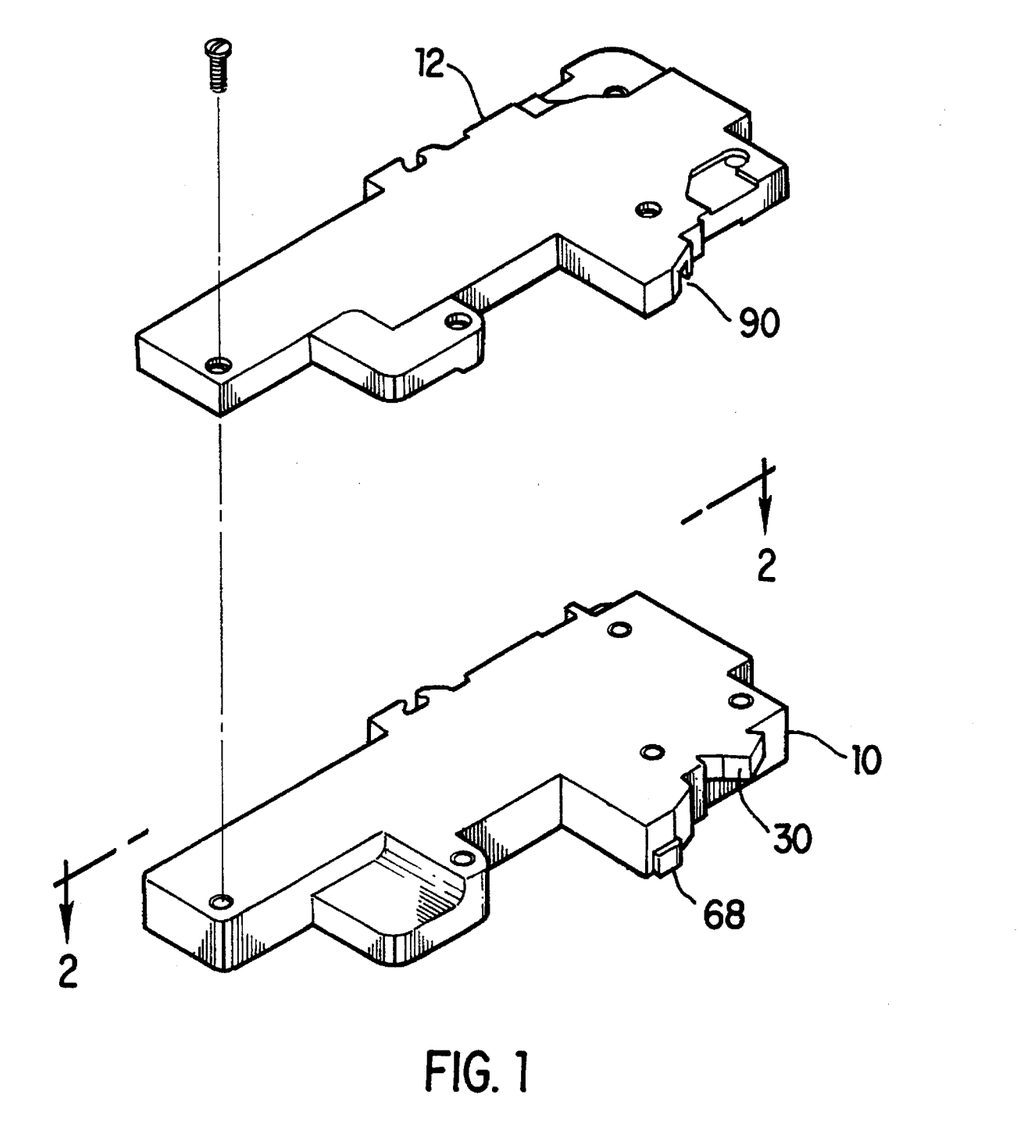
FIG. 1 is a perspective view of a remote controlled circuit breaker wherein the manual override mechanism according to the present invention may be used, illustrating the housing and cover.
Figure 2:
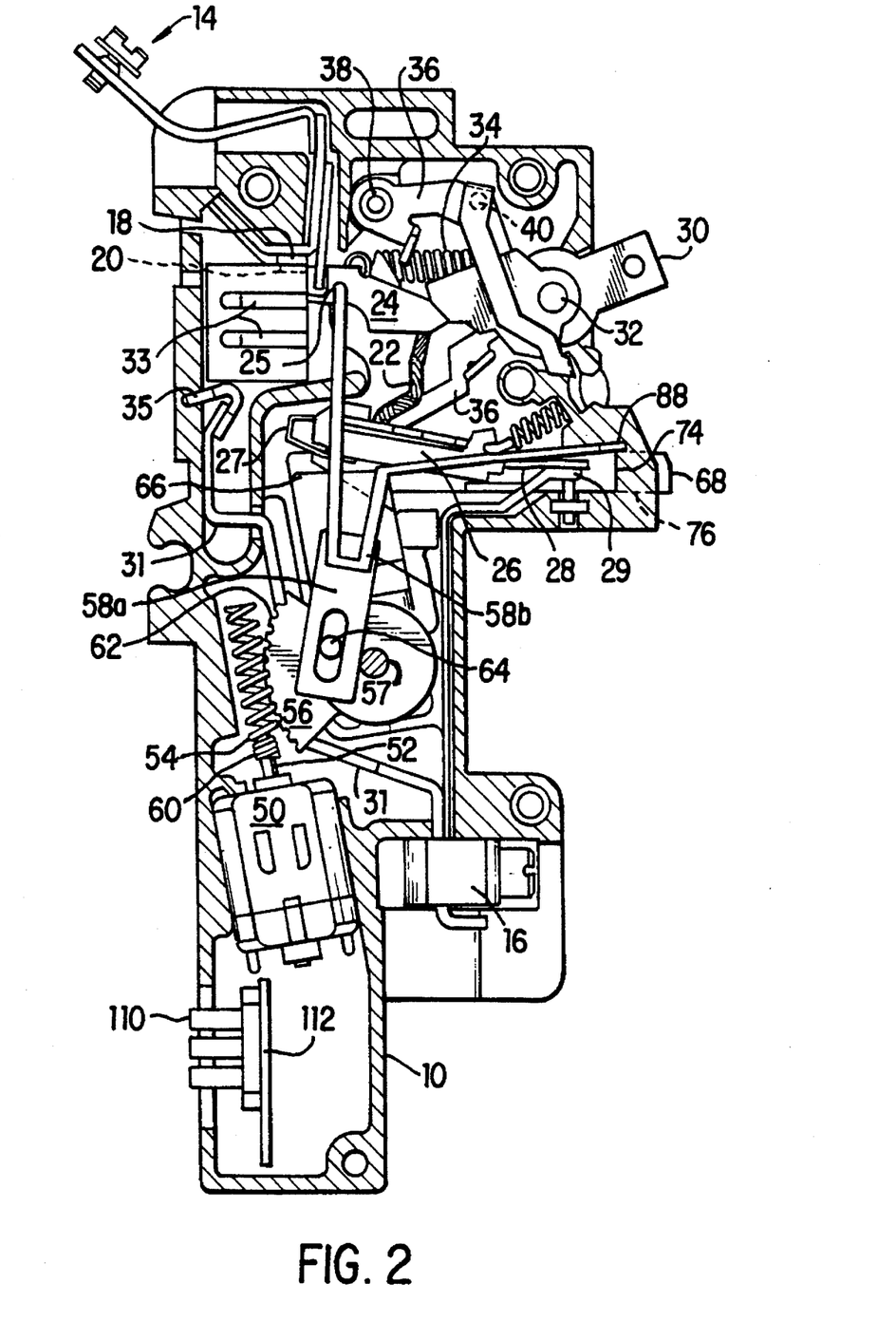
FIG. 2 is a side view of the circuit breaker of FIG. 1 with the cover removed, showing the circuit breaker in the closed position.
Figure 4:
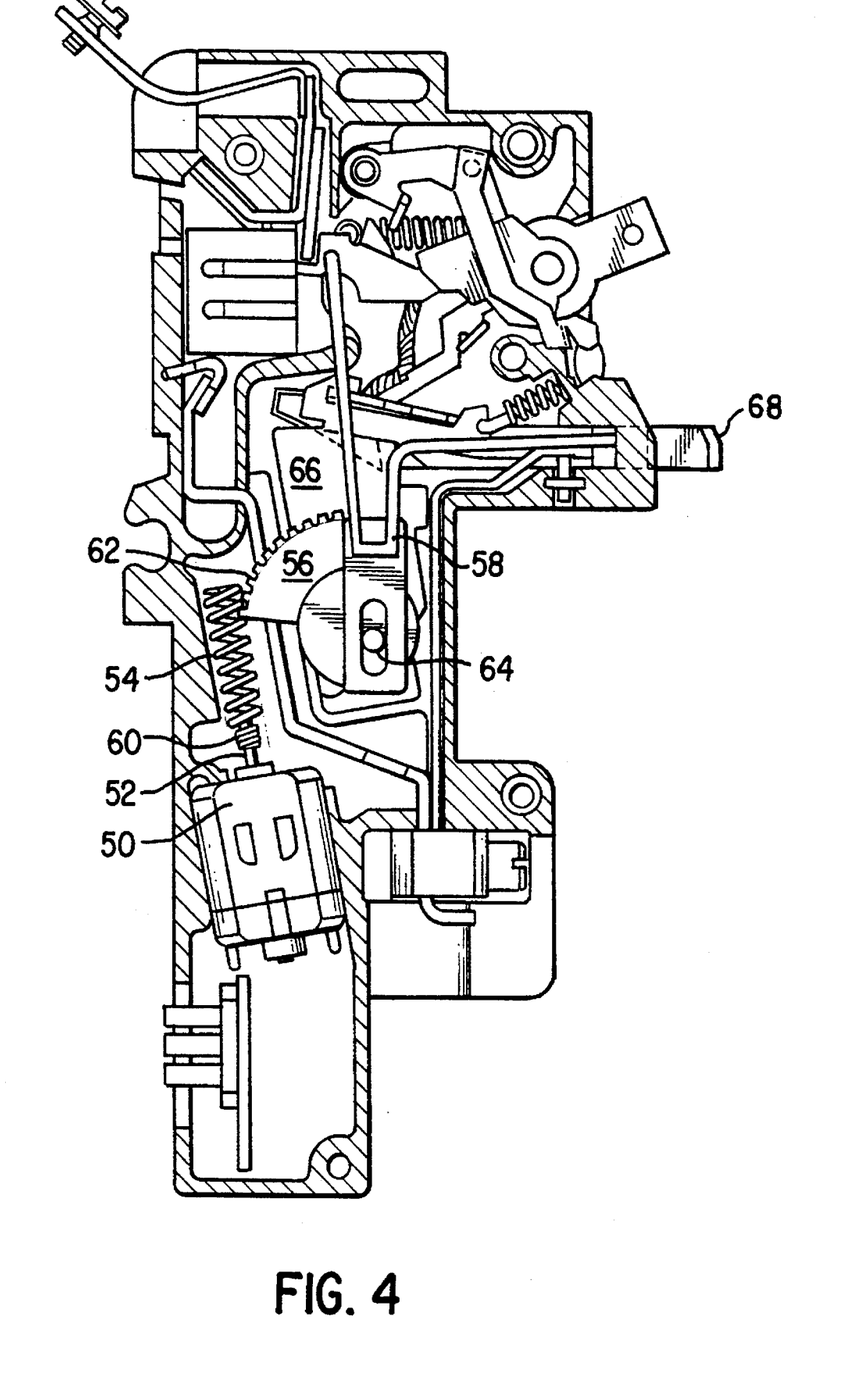
FIG. 4 is a side view of the circuit breaker with the cover removed, showing the circuit breaker with its remote control mechanism in the disabled position.
Figure 5:
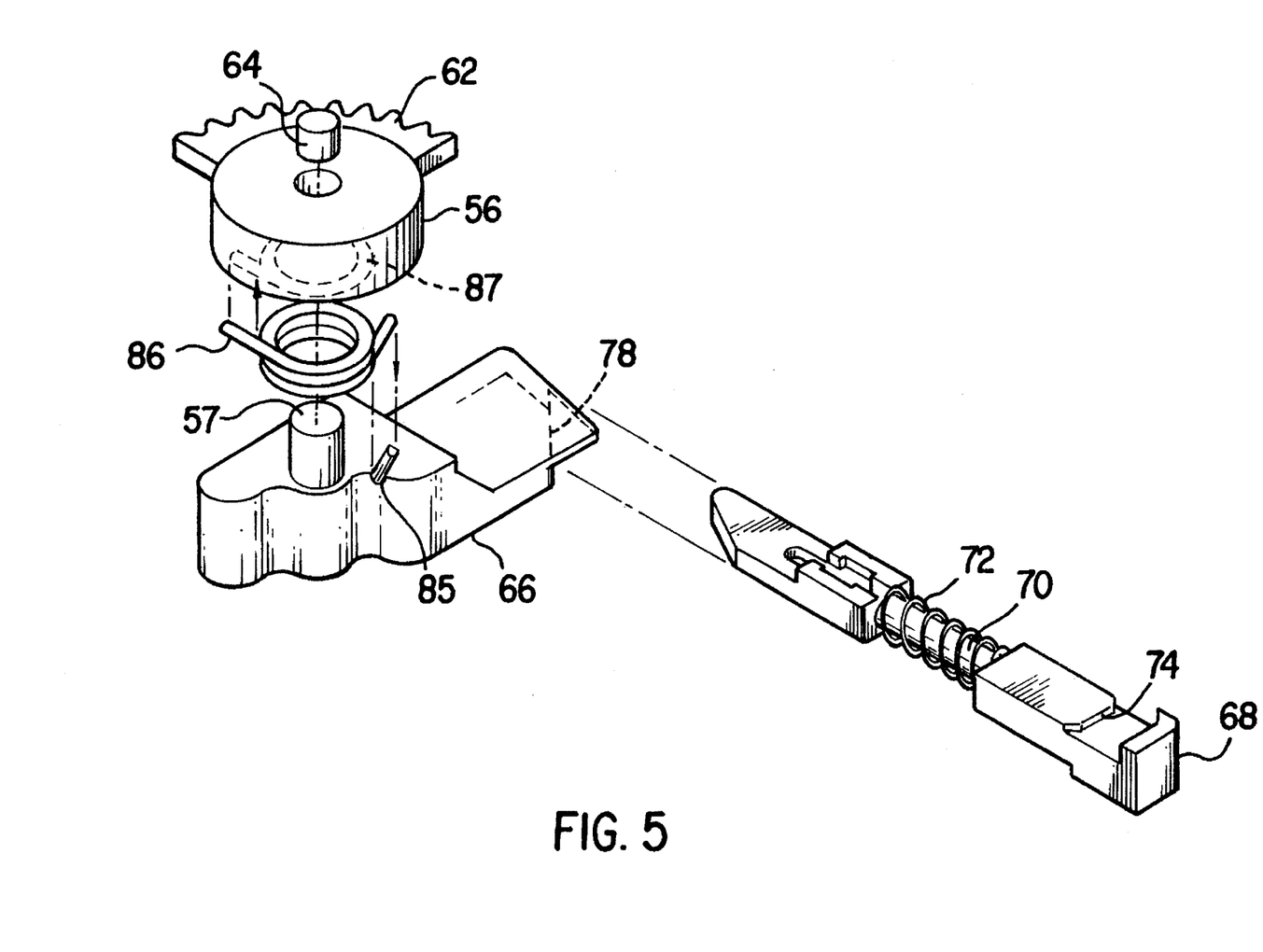
FIG. 5 is a perspective view illustrating the manual override mechanism used to disable the remote control mechanism for the circuit breaker of FIGS. 1–5, according to an illustrative embodiment of the present invention.

According to a feature of the present invention, the remote control circuit breaker arrangement described above is provided with a manual override mechanism whereby an operation may activate or use the breaker when the remote control mechanism is not in use. More specifically, the pin 57, about which the gear 56 rotates, is defined as an integral part of a slide mechanism 66 (FIG. 5) and may be used to override or disable the remote control mechanics of the circuit breaker. As illustrated in FIGS. 2, 4–5, the override mechanism of this invention includes a manually operated override button 68 which, when pressed, laterally releases a holding force from the slide mechanism 66. The holding force is implemented with a spring 72, supported by and surrounding an elongated member 70, urging a shoulder 74 of the elongated member 70 against the inside surface of the housing in a aperture 76. When the compression on the spring 72 is released, an angled edge 78 in the slide mechanism 66 forces the elongated member 70 toward the aperture 76 so that the slide mechanism 66 no longer has a fixed position from which the pin 64 can pull the contact carrier 24. Consequently, the slide mechanism 66, rather than the contact carrier 24, moves in response to the rotation of the shaft spring 54.

The slide mechanism 66 is also designed to prevent lockup of the gear 56 on the shaft spring 54 when the remote control mechanics of the circuit breaker are not disabled and are being controlled by the motor 50. Because the shaft spring 54 can drive the gear 56 to either end of its teeth, it is conceivable that the motor 50 can overdrive the gear 56 to the extent that the shaft spring 54 is unable to retain control over the position of the gear 56. As illustrated in FIG. 5, to prevent this potential lock-up situation, a torsion spring 86 may be situated in a slot 85 on the slide mechanism 66 and in a slot 87 in the gear 56 to spring-load the gear 56 in the clockwise or counterclockwise direction. The torsion spring 86 thereby prevents gear overdrive when the gear rotates in the either direction, i.e., to allow the contacts to close or to force the contacts open.

In a preferred embodiment, the torsion spring 86 biases the gear 56 clockwise when the gear is overdriven during counterclockwise rotation, so that the teeth 62 retain engagement with the shaft spring 54. If the gear 56 is overdriven after its clockwise rotation, the biasing spring 34 biases the gear 56 counterclockwise, by pulling the coupling pin 64 via the contact carrier 24 and the coupling member 58, so that the teeth 62 retain engagement with the shaft spring 54.

Figure 7:
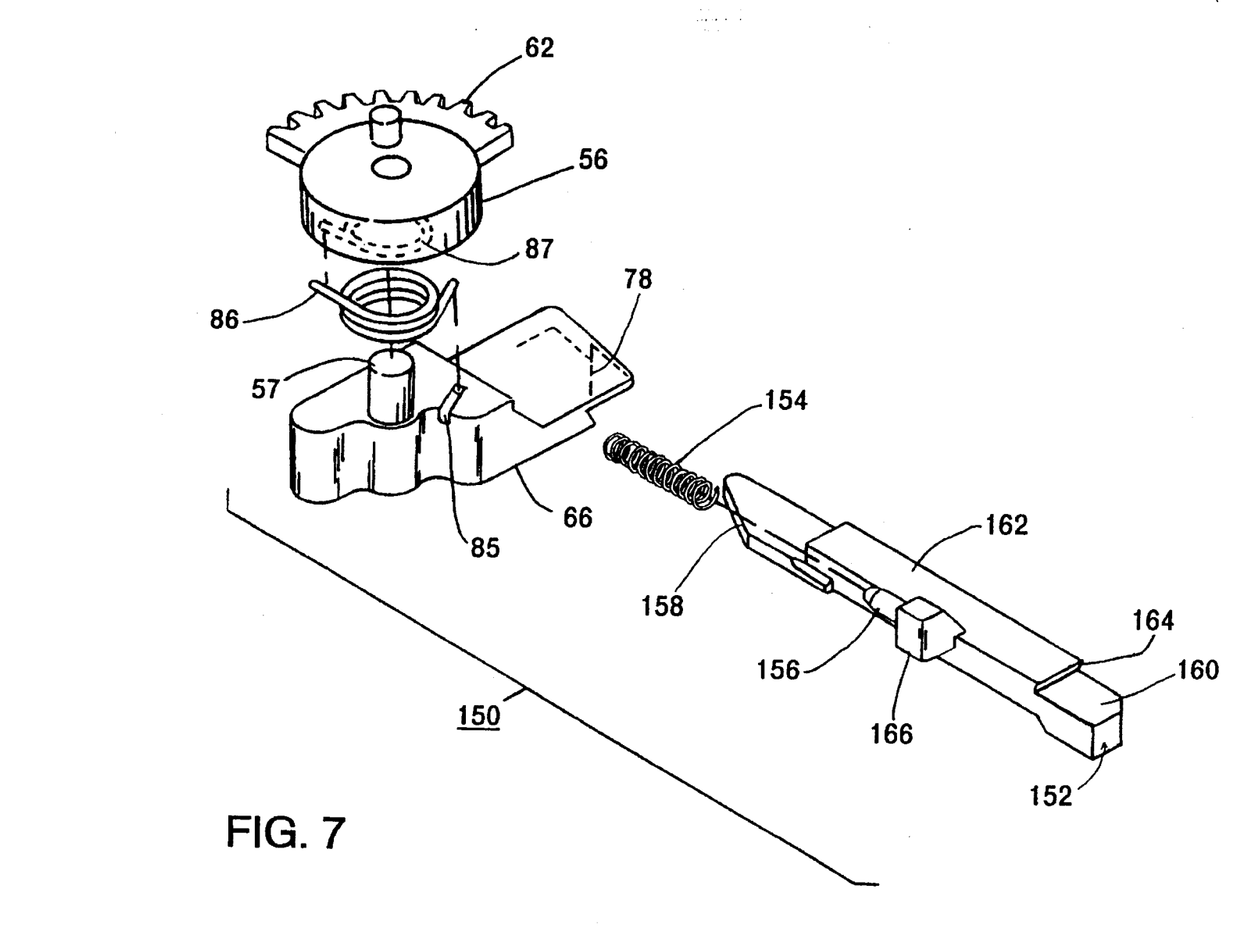
FIG. 7 is a perspective view of a preferred embodiment of the manually operated override mechanism of this invention for use with the circuit breaker of FIGS. 1–5 in order to disable the remote control mechanism.

FIG. 7 shows a preferred embodiment of a manual override mechanism 150 which uses an alternative design for the override button described above in connection with FIG. 5. The override button 152 shown in FIG. 7 operates similar to the override button 68 of FIG. 5. In particular, the button 152 also cooperates with the slide mechanism 66 and overrides or disables the remote control mechanism of the circuit breaker when the button is pressed laterally so as to release a holding force form the slide mechanism 66.

The releasable holding force is implemented by means of a spring 154 which is mounted on an elongated pin-like extension 156 disposed on the button 152. As illustrated in FIG. 7, the override button 152 preferably has an elongated body integrally comprising a relatively flat angled edge portion 158 at its leading end. The edge portion 158 is linked to a button-like extension 160 at its trailing end through a flat central portion 162 which defines a shoulder 164 about the junction thereof with the button-like extension 160. The elongated extension 156 projects outwardly in a position substantially parallel to the general length of the override button 152 from a support portion 166 extending from a side of the flat central portion 162 of the button 152.

With the above arrangement, the releasable force exerted by the spring 154 urges the shoulder 164 on the override button 152 against a corresponding obstruction, such as a ridge (not shown) on the inside surface of the housing 10 about the aperture 76 (see FIG. 2). In its active position, the spring 154 is supported on one end by the elongated extension 156 and on the other end by the housing 10.

In normal remote control operation the releasable holding force created by the spring 154 holds the leading angled edge 79 of the override button 152 against the angled edge 78 in the slide mechanism 66, thereby causing the slide mechanism 66 to slide forward into a fixed position and allowing the coupling pin 64 associated with the gear 56 to pull the contact carrier 24. When the override button 152 is depressed so that the shoulder 164 is removed from engagement with the breaker housing, the compression on the spring 154 is released. This, in turn, forces the override button 152 toward the aperture 76 and separates the leading angled edge 158 from the slide mechanism angled edge 78. As a result, the slide mechanism 66 no longer has a fixed position from which the coupling pin 64 can pull the contact carrier 24. Consequently, the slide mechanism 66, rather than the contact carrier 24, moves in response to the rotation of the shaft spring 54, thereby disabling or overriding the remote control mechanism of the circuit breaker.

Referring once again to FIGS. 2 and 3, the circuit breaker arrangement described above also includes means for providing a reliable, and conveniently implemented, fail-safe contact status indication for local (versus remote) supervision. Because the hook-shaped leg portion of the drive rod assembly 58 is shaped into an aperture 25 in the contact carrier 24, movement of the moveable contact 20 can be reliably detected by observing the corresponding movement of the hook-shaped coupling member 58*b* . Thus, a portion 88 of the hook-shaped coupling member 58 is shaped to be observed through an aperture (or window) 90 in the cover 12 (FIG. 1 ) of the housing. Preferably, a white cap (not shown) is used on the end of the portion 88 so that, when observed through the aperture 90, the white cap indicates that the contacts 18 and 20 are together. Conversely, when the white cap cannot be observed, the contact carrier 24 has moved the white cap to its hidden position on the motor side of the aperture 90. In either case, an observer can easily determine whether the contacts 18 and 20 are closed by looking at the front of the circuit breaker. Because the hook-shaped coupling member 58 is secured to both the contact carrier 24 and the gear 56 with no intervening, breakable parts, observing the portion 88 reliably indicates the position of the contact carrier 24.

The circuit breaker arrangement shown in FIGS. 1–4 is also adapted to shunt energy around the bimetal member 28 during short circuit conditions. Extending down from the load lug 16 to arc plates 33 is a shunt terminal 31 (similar to the load terminal 29), which dissipates arcing current during the short circuit conditions. An arc yoke 35 is used to attract the arc and shunt current around the bimetal member 28. This type of arc shunting practice is conventional in expanding the short circuit capacity of the breaker, which is otherwise limited by the current capacity of the bimetal member 28.

Most of the nonconductive components, e.g., the housing 10, the cover 12 and the operating handle 30, may be made from a thermoset-type plastic. The hook-shaped coupling member 58*b* and the springs may be manufactured using any durable metal.

Electrically, the preferred circuit breaker arrangement is operated using signals which pass through a plug-in connector 110 and a circuit board assembly 112. The plug-in connector 110 provides a conveniently removable interconnection between the circuit breaker and a remotely located control/monitoring device, while the circuit board assembly 112 carries the interface circuit for controlling the motor 50 and monitoring the current delivered to the load through load terminal 16.

Figure 6:
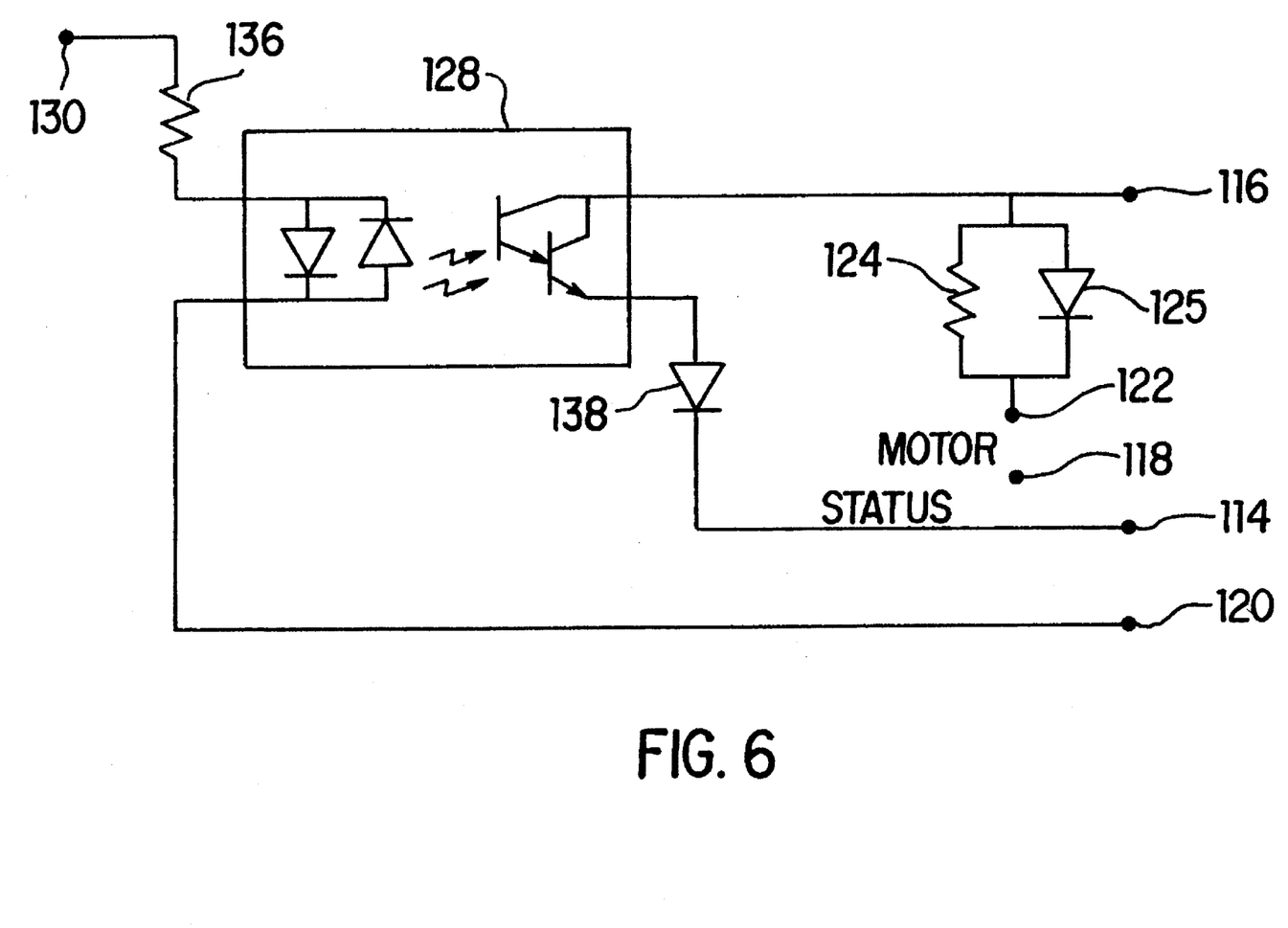
FIG. 6 is a schematic diagram of an electrical circuit which may be used to control the circuit breaker arrangement of FIGS. 1–5 and to monitor and report the status of the contacts.

FIG. 6 depicts a schematic diagram of the circuit on the circuit board assembly 112. There are four leads carried by the plug-in connector 110; they include: a status lead 114, positive and negative motor leads 116 and 118, and a neutral lead 120, which is common to the circuit breaker and the device providing the remote control signaling.

The motor 50, which is preferably implemented using a FK130S-10300 Mabuchi DC motor, is directly connected to the circuit board assembly 112 at lead 118 and lead 122, with lead 116 connected to the motor 50 indirectly through a parallel resistor/diode arrangement 124/125. The parallel resistor/diode arrangement 124/125 serves two functions. The diode 125 may be used to provide current flow in a unilateral direction, while the resistor 124 is used to control the power provided from lead 116 to the motor 50.

The value of the resistor 124 is selected according to the necessary current specified to operate the motor. In the event that the lead 116 is used to control a motor, e.g., for controlling two or three circuit breaker poles, the resistance required will vary. For single pole operation by the FK130S-10300 Mabuchi motor exemplified above, the value of the resistor 124 is preferably 12 Ohms.

Forward and reverse rotation of the motor shaft 52 is then provided by applying the appropriate voltage to either lead 116 or lead 118. Provision of +24 Volts over lead 116, with respect to ground, will rotate the motor shaft 52 to cause the contact carrier 24 to separate the contacts 18 and 20, and provision of −24 Volts over lead 118, with respect to ground, will rotate the motor shaft 52 in the opposite direction to allow the contacts 18 and 20 to reconnect in the previously discussed manner.

The current that is provided to the load is remotely monitored using a sensor which is optically or magnetically coupled to the load side of the circuit breaker and communicatively coupled to the remote control/monitoring station via status lead 114 and the plug-in connector 110. The status lead 114 may be directly connected (or coupled via a radio or other nonwire interface) to the remote control signaling device to report whether or not the current path to the load has been interrupted. This is accomplished using a line isolation circuit, e.g., opto-isolator 128 (FIG. 6), having an input connected to the load terminal 16 (also shown in FIG. 2 where lead 130 is connected to the shunt terminal 31) and having an output, lead 114, connected directly to the remote control signaling device. While current is being provided to the load, current passes through current limiting resistor 136 to activate the opto-isolator 128. When activated, the opto-isolator 128 passes current o through its collector-emitter output ports so as to report to the remote control/monitoring device via leads 116 and 114. When current to the load is interrupted, voltage at lead 130 is absent and the output ports of the opto-isolator 128 do not pass current; thereby indicating to the remote control/monitoring device that the contacts have interrupted the current path provided to the load. The resistor 136, preferably 180 k Ohms at a ½ Watt rating, may be used at the input of the opto-isolator 128 to offset the heat dissipating through the opto-isolator 128.

A diode 138 may be used to prevent reverse current from causing false contact status readings in other parts of the system, e.g., from another circuit board assembly 112 OR-tied at lead 114. Such a configuration is described in detail in the aforementioned copending application.

The signal which is transmitted from the remote control/monitoring device to open or close the contacts is preferably a DC pulse having a prescribed width. This pulse width is selected in accordance with a calculated and premeasured test signal to rotate the gear 56 over a predetermined angle and, thus, move the contact carrier 24 linearly over a predetermined length so that the contacts 18 and 20 are separated or closed.

The remote control/monitoring device may then check lead 114 to determine if the circuit breaker properly responded to the transmitted contacts-open (contacts-closed) command. If the lead 114 indicates that the contacts-open (contacts-closed) command was not obeyed properly, the remote control/monitoring device may then transmit one or more additional pulses in an attempt to move the contact carrier 24 slightly further. Preferably, the remote control/monitoring device transmits up to three additional pulses, one at a time, until the lead 114 indicates that the contact carrier 24 has reacted as instructed. Preferably, the original pulse width is about 47 milliseconds to open the contacts and about 14 milliseconds to close the contacts. The pulse width of each of the follow-up pulses is equivalent to the original pulse width.

The foregoing description is not limited to the specific embodiment herein described, but rather by the scope of the claims which are appended hereto. For example, although the invention has been described with reference to a single pole circuit breaker, the design may be easily adapted to a multipole circuit breaker to be operated from a remote location. Moreover, in certain applications, it is conceivable that the motor/gear assembly may be replaced by a solenoid operated mechanism. In particular, the illustrative manual override mechanism may be used effectively with alternative coupling arrangements or drive rod assemblies different from that described above for coupling the driving gear means to the movable contact.

What is claimed is:

1. A remotely controllable circuit breaker device for interrupting power in a circuit path between a source and a load, comprising:

a housing;

a first contact and a second contact within said housing and cooperatively arranged in the circuit path so as to provide current from the source to the load and at least one of the contacts being secured to a contact carrier which is movable for interrupting the power provided to the load;

a motor having a rotatable shaft, said motor being responsive to remote control signals generated from a remote location;

gear driving means, rotatably responsive to the rotatable shaft, for moving the contact carrier so that the circuit path may be interrupted or established in response to the remote control signals;

a coupling arrangement, having a first part coupled to said contact carrier and a second part coupled to said gear driving means, operating in a normal mode which is responsive to said gear driving means so that the circuit path is interrupted or established in response to the remote control signals;

a slide mechanism, coupled to said gear driving means, which is movable between a fixed position, which renders said coupling arrangement responsive to the remote control signals, and a non-fixed position, which allows free movement thereof and renders said coupling arrangement nonresponsive to the remote control signals; and a manually operated member supported in said housing and movable between (i) a first position wherein said manually operated member engages and activates said slide mechanism to said fixed position thereby rendering the coupling arrangement responsive to the remote control signals, and (ii) a second position wherein said manually operated member is disengaged from and activates said slide mechanism to said non-fixed position, thereby rendering the coupling arrangement nonresponsive to the remote control signals.

2. A circuit breaker device, according to claim 1, wherein said manually operated member further includes a first angled edge, which interacts with a corresponding second angled edge in said slide mechanism, said first and second angled edges interact to render said coupling arrangement responsive to said gear driving means.

3. A circuit breaker device, according to claim 1, wherein said manually operated member is a one piece elongated formed member.

4. A circuit breaker device, according to claim 1, wherein said manually operated member further includes a spring arm member integral thereto.

5. A circuit breaker device, according to claim 4, wherein said spring arm member further includes an elongated member integral thereto and extending therefrom.

6. A circuit breaker device, according to claim 5, further including a spring extending from and surrounding said elongated member, wherein said spring provides a releasable force.

7. A circuit breaker device, according to claim 1, wherein said manually operated member further includes a shoulder, which rests against an inside surface of said housing.

8. A remotely controllable circuit breaker device for interrupting power in a circuit path between a source and a load, comprising:

a housing;

a first contact and a second contact cooperatively arranged in the circuit path, and within the housing, so as to provide current from the source to the load and at least one of the contacts being secured to a contact carrier which is moved to interrupt the power provided to the load;

a motor having a rotatable shaft, said motor being responsive to open and close remote control signals generated from a remote location;

gear driving means, rotatably responsive to the rotatable shaft, for moving said contact carrier so that the circuit path may be interrupted or established, in response to the remote control signals;

a coupling arrangement, having a first part coupled to said contact carrier and a second part coupled to said gear driving means, operating in a normal mode which is responsive to said gear driving means so that the circuit path is interrupted and established in response to the open and close remote control signals, respectively;

a slide mechanism, coupled to said gear driving means, which is movable between a fixed position, which renders said coupling arrangement responsive to the remote control signals, and a non-fixed position, which allows free movement thereof and renders said coupling arrangement nonresponsive to the remote control signals;

a manually operated member supported in said housing and movable between (i) a first position wherein said manually operated member engages and activates said slide mechanism to said fixed position thereby rendering the coupling arrangement responsive to the remote control signals, and (ii) a second position wherein manually operated member is disengaged from and activates said slide mechanism to said non-fixed position, thereby rendering the coupling arrangement nonresponsive to the remote control signals; and releasable holding force means for holding said manually operated member in a forced engagement with said slide mechanism, thereby holding said slide mechanism in said fixed position until the releasable holding means is released, said releasable holding force means forcing said manually operated member to separate from said slide mechanism when said releasable force means is released thereby placing said slide mechanism in said non-fixed position;

wherein said contact carrier does not move while said slide mechanism moves in response to rotation of said rotatable shaft so that the circuit path is not interrupted and established in response to the remote control signals when said slide mechanism is in said non-fixed position.

9. A circuit breaker device, according to claim 8, wherein said releasable holding force is implemented with a spring, whereby one end of said spring surrounds an elongated member extending from a spring arm member that is integral to said manually operated member, and an opposite end supported in said housing.

10. A circuit breaker device, according to claim 8, wherein said manually operated member further includes a first angled edge, which interacts with a corresponding second angled edge in said slide mechanism, said first and second angled edges interact to render said coupling arrangement responsive to said gear driving means.

11. A circuit breaker device, according to claim 8, wherein said manually operated member extends through an aperture in said housing.

12. A circuit breaker device, according to claim 8, wherein said manually operated member further comprises a releasable breaker housing engagement means for interacting with said housing to counteract said releasable holding force means so that said slide mechanism is held in a fixed position allowing said coupling arrangement to be responsive to the remote control signals.

13. A circuit breaker device, according to claim 12, wherein said releasable breaker housing engagement means is a shoulder portion integral to said manually operated member, said releasable breaker housing engagement means is released by moving said manually operated member laterally, thereby removing said shoulder portion from its interacting engagement with said housing.

14. In a circuit breaker panelboard having a plurality of circuit breakers arranged to interrupt respective circuit paths feeding respective loads, at least one circuit breaker comprising:

a housing having an access port;

a first contact disposed in the housing;

a second contact, disposed in the housing, movable between at least one open position and a closed position, the second contact being spaced from the first contact in the open position, and the second contact being in contact with the first contact in the closed position;

movement means, disposed in the housing, for causing the second contact to move between the open position and the closed position;

a circuit board assembly, disposed in the housing, having circuitry for providing status information to the access port; and terminal means, disposed in relation to the access port of the housing, for providing communicative access to the circuitry of the circuit board assembly.

15. The circuit breaker as recited in claim 14, wherein the open position includes a blown-open position and a manually-open position.

16. The circuit breaker as recited in claim 14, wherein the open position includes a remotely-controlled open position.

17. The circuit breaker as recited in claim 14, wherein the circuitry of the circuit board assembly is adapted to receive external control signals provide at the terminal means for controlling the movement means.

18. A circuit-monitoring arrangement, comprising:

a circuit breaker for interrupting the current flow in a circuit path between a source and a load, including
a housing having an access port,
a first contact disposed in the housing, a second contact, disposed in the housing, movable between at least one open position and a closed position, the second contact being spaced from the first contact in the open position, and the second contact being in contact with the first contact in the closed position, movement means, disposed in the housing, for causing the second contact to move between the open position and the closed position, a circuit board assembly, disposed in the housing, having interface circuitry for providing status information to the access port, and terminal means, disposed in relation to the access port of the housing, for providing communicative access to the circuitry of the circuit board assembly; and a microcomputer means, coupled to the terminal means, for receiving the status information.

19. The circuit-monitoring arrangement as recited in claim 18, wherein the microcomputer means further provides open and close control signals to the terminal means, and the interface circuitry is adapted to receive the control signals so as to control the movement means.

20. The circuit-monitoring arrangement as recited in claim 18, wherein the open position includes a blown-open position and a manually-open position.

21. The circuit-monitoring arrangement as recited in claim 18, wherein the open position includes a remotely-controlled open position.

* * * * *